July 22, 1952 L. H. MOOMAW 2,604,271
PROJECTION AND REWINDING SYSTEM FOR MOTION-PICTURE PROJECTORS
Filed Oct. 17, 1946 2 SHEETS—SHEET 1
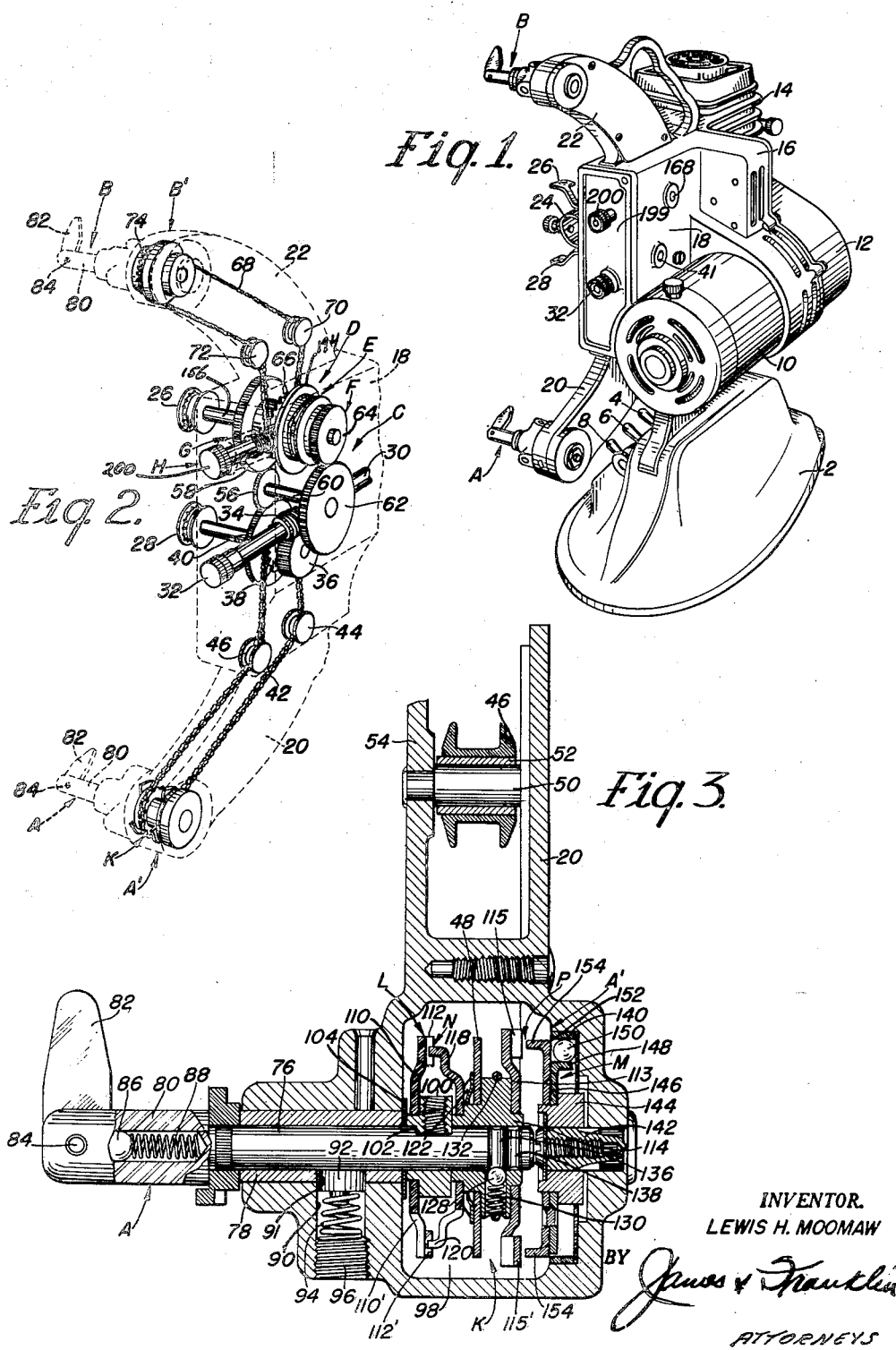
INVENTOR.
LEWIS H. MOOMAW
BY
ATTORNEYS

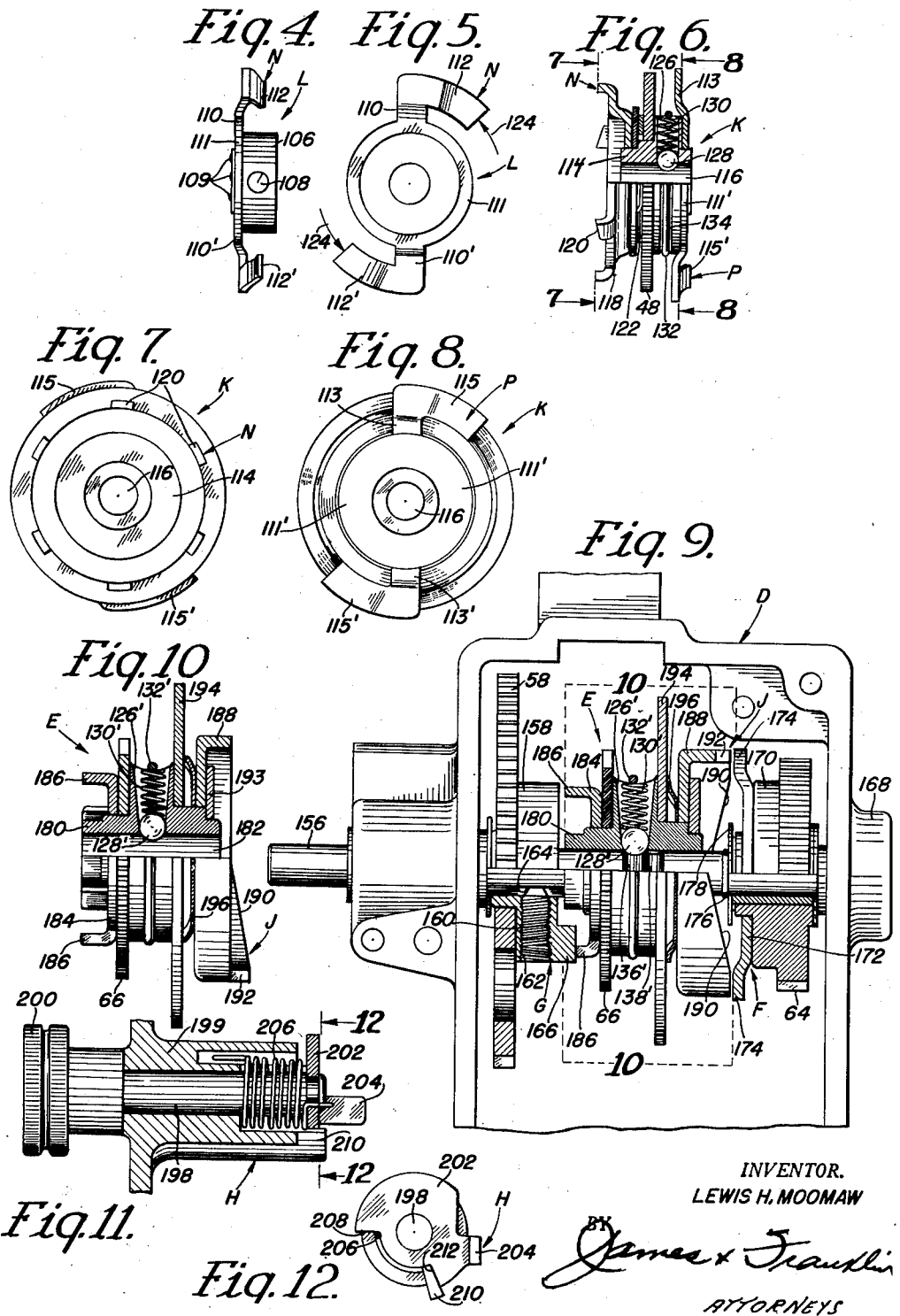

Patented July 22, 1952

2,604,271

UNITED STATES PATENT OFFICE 2,604,271

PROJECTION AND REWINDING SYSTEM FOR MOTION-PICTURE PROJECTORS

Lewis H. Moomaw, Great Neck, N. Y., assignor to De Jur-Amsco Corporation, Long Island City, N. Y., a corporation of New York Application October 17, 1946, Serial No. 703,807

13 Claims. (Cl. 242—55)

The present invention relates to a motion picture projector and more particularly to a rotation-transmission system for the reel supports thereof.

At the outset it is desirable to define several terms which will be used herein. With reference to the projector as a unit, operation is possible in two directions, one in which the film moves through the projector in normal fashion, herein termed the "projection" direction, and one in which the film moves through the projector in a direction opposite thereto. The film may move in this latter direction for two purposes, the normal purpose being that of rewinding projected film upon its supply reel so as to place that reel in condition for subsequent normal projection, and the other purpose being to project the film through the projector backwardly in order to achieve unusual or trick projection effects. Operation of the projector in this direction will herein be termed "rewinding," it being understood that the employment of the projector for trick projection effects is also effectuated by operating the projector in this direction.

With reference to a particular reel support, that support may be said to rotate either in a direction such as to wind film upon the reel attached thereto or in a direction such as to unwind film from the reel attached thereto. These two directions are herein termed "winding" and "unwinding" directions, these two terms being used only when the operation of a single reel arm is under consideration and the words "projection" and "rewinding" being used to describe the overall operation of the projector.

In a motion picture projector, and particularly in a home motion picture projector likely to be used by operators of widely varying mechanical skills, certain operational problems are involved, those most pertinent to my present invention being as follows:

1. The reel supports upon which the film reels are placed must be drivable in a winding direction and must be free to rotate in an unwinding direction. This is conventionally accomplished by the employment of uni-directional transmissive clutches, commonly of the centrifugal ball type.

2. Such conventional clutches, when any part thereof is operated in a non-transmissive direction at a speed in excess of normal, do not retain their non-transmissive properties and consequently are subject to malfunctioning and excessive wear.

3. Projection in a normal direction must take place at a speed which, while it may be variable, must be a relatively low speed determined by the speed at which the pictures on the film were taken and by the optical characteristics of the human eye.

4. The rewinding operation, in which the film is disconnected from the sprocket wheels and runs directly from one reel to another, should take place at as high a speed as possible consistent with the strength of the film and the structure of the projector, this operation being a complete waste of time insofar as the entertainment or educational value of the projector is concerned.

5. The factors limiting the speed at which projection in a normal direction may be made similarly limit the speed at which projection in a reverse direction from normal must be made. Such projection must, therefore, be made at the relatively low speed referred to in paragraph No. 3 above.

6. The operators of a projector in which a special high speed is provided for rewinding often switch to that high speed for the rewinding operation, rethread the film over the sprocket wheels and through the projector, and forget to switch to low speed before starting the motor in a direction for normal projection, in which case projection is attained at the high speed with attendant strains and excessive wear on the film and on the operating mechanism of the projector.

It is a prime object of the present invention to provide a substantially fool-proof projector in which a speed higher than that used in normal projection may be used for the rewinding operation without excessive wear or breakage of clutches and without excessive strain on the film.

It is a further prime object of the present invention to provide a substantially fool-proof projector capable of operation at normal speed for projection both in normal and reverse direction and capable of high speed operation only for rewinding, and to provide such a projector in which a shift from projection to rewinding direction maintains normal low speed transmission unless the operator positively shifts to high speed and in which a shift from rewinding direction to projection direction automatically shifts the projector from high speed to low speed irrespective of any action or lack of action on the part of the operator.

It is a further object of the present invention to attain the above objects in a projector having a motor which operates at a single speed for both directions of rotation.

It is yet another object of the present invention to attain the above objects by speed-selection means and clutches which feature positive connection and disconnection in contradistinction to the employment of frictional connecting means, such as cork or rubber, which have frequently been employed heretofore.

To the accomplishment of the foregoing objects and such other objects as may hereinafter appear, the present invention relates to the motion picture projector rotation-transmission system as sought to be defined in the appended claims and as described in this specification, taken together with the drawings appended thereto, in which:

Fig. 1 is a perspective view of a motion picture projector embodying my invention;

Fig. 2 is a perspective schematic view of the rotation-transmission system thereof;

Fig. 3 is a cross-sectional view, with parts broken away, of the lower reel support and part of the lower reel arm;

Fig. 4 is a side view of the driven member of the lower reel arm assembly;

Fig. 5 is an end view thereof;

Fig. 6 is an end view, partially cross-sectioned, of the driving member of the lower reel arm assembly;

Fig. 7 is a view thereof taken along the line 7—7 of Fig. 6;

Fig. 8 is a view thereof taken along the line 8—8 of Fig. 6;

Fig. 9 is a partially cross-sectioned view of the speed-selection means embodied herein;

Fig. 10 is an end view, partially cross-sectioned, of the driven means enclosed in the broken line 10—10 of Fig. 9;

Fig. 11 is a side view, partially cross-sectioned, of the manual actuating means for the speed-selection means; and Fig. 12 is an end view taken along the line 12—12 of Fig. 11.

The transmission system

Broadly described, and having reference only to the features thereof pertinent to the invention herein claimed, my projector comprises a pair of reel supports, generally designated A and B, on which film reels are adapted to be placed for rotation, the lower reel support A being hereinafter termed the projection reel support because when the film is wound upon the reel attached thereto the projector is operating in its "projection" or normal direction, and the upper reel support B being hereinafter termed the rewinding reel support because when film is wound upon the reel attached thereto the projector is operating in its "rewinding" direction.

Clutches A' and B' connect their respective reel supports A and B to the remainder of the transmission system, generally designated C, and shown in perspective schematic in Fig. 2. Each of the clutches A' and B' is so constructed as to transmit rotation from the transmission system C to its respective reel support A or B only when such reel support would thereby be rotated in a winding direction, and to render said reel support B rotatable and said reel support A freely rotatable with respect to the speed of rotation of the transmission system C when said reel support A or B is rotated in an unwinding direction. These directions are so coordinated with the direction of rotation of the transmission system C that when the transmission system C is rotating in such a direction as to operate the projector in a projection direction, the projection reel support A is driven in a winding direction and the rewinding reel support B is able to rotate in an unwinding direction, and when the transmission system C is rotating in a direction such as to drive the projector in a rewinding direction, the rewinding reel support B is driven in its winding direction and the projection reel support A is free to rotate in an unwinding direction.

The clutch B' may be of conventional centrifugal ball construction, but the clutch A' is specially formed, as later described herein in detail, because it may, by reason of the speed selection means D in the transmission system C, be rotated during the rewinding operation at a speed far in excess of that to which conventional clutches may be subjected.

The speed selection means D comprises a driven means E alternatively connectable to a high speed part F or to a low speed part G of the transmission system C. A manually operated means, generally designated H, is effective to connect the driven means E to the high speed part F only when the transmission system C is rotating in a rewinding direction, and a control means J on the driven means E and the high speed part F is effective to prevent the engagement of those two parts when the transmission system is operating in a winding direction even if the manually operated means H is suitably actuated and to automatically ensure the disconnection of the driven means E from the high speed part F and the connection of said driven means E to the low speed part G upon the reversal of the direction of rotation of the transmission system C from rewinding to projection.

If, during the rewinding operation, the manually operated means H be actuated to connect the driven means E to the high speed part F, the rewinding reel support B will be driven at an exceedingly high speed and consequently the projection reel support A must be free to rotate at a rate of rotation in excess of the rate of rotation of the rewinding reel support B, the excess speed being attained when the rewinding reel contains more film than the projection reel. Such speeds are, as has been mentioned, far in excess of those to which the conventional centrifugal ball clutch may be subjected. Accordingly, the clutch A' is of special construction in which no centrifugal or frictional action is relied upon to connect and disconnect the clutch A' from driving relation to its reel support A, but in which connection is positively severed or made within the clutch.

To this end the clutch comprises a driving means K, a driven means L attached to the projection reel support A, an idler means M and control means N and P, the former on driving means K and driven means L and the latter on driving means K and idler means M, sensitive to the direction of rotation of the driving means K in such a manner that when the driving means K is rotated in a direction for winding of projection reel support A, the driving means K is automatically connected to the driven means L, and when the driving means K is rotated in a direction for unwinding the projection reel support A, the driving means K is positively disconnected from the driven means L and is connected to the idler means M.

By the above described combination of transmission system C, clutches A' and B' and speed selection means D, the previously described problems and objects are respectively solved and attained by means of a mechanism largely automatic in operation and substantially fool-proof.

General description of the projector

My invention is herein illustrated and described as embodied in a small home motion picture projector specifically adapted for the projection of 8 millimeter film but it is apparent that my invention is broad in scope and is not to be limited to this type of projection.

The projector as illustrated (see Fig. 1) comprises a base 2 including switches 4, 6 and 8 for controlling the illumination, the operation of the motor, and the direction of operation thereof respectively, on which is tiltably mounted the projector housing proper including a motor housing 10 in which is mounted the driving motor for the projector (not shown), a fan housing 12, a lamp housing 14 in which is mounted the projection lamp (not shown) a projection machinery housing 16, a gear box housing 18 in which is housed the speed selection means D and part of the transmission system C, a pair of reel arms 20 and 22 at the extremities of which are mounted the reel supports A and B, a projection lens assembly 24 and a pair of sprocket wheel assemblies 26 and 28 for controlling the passage of the film past the projection lens assembly 24 during projection.

All of the above mentioned elements may be of conventional construction. A more detailed description of certain of them may be found in my copending applications No. 703,806 of October 17, 1946, now Patent No. 2,495,018 of January 17, 1950, and No. 703,808 of October 17, 1946, now Patent No. 2,468,993 of May 3, 1949, and in my Patent No. 2,440,966 of May 4, 1948.

Fig. 2 illustrates the path of transmission derived from the projector motor as it passes to the active rotating elements of the projector, to wit, the reel supports A and B and the sprocket wheel assemblies 26 and 28. Rotation of the motor is transmitted by suitable gearing (not shown) to a drive shaft 30 an end of which projects through the front of the gear box housing 18 and to which is attached control knob 32, by rotation of which, when the motor is stopped, any desired frame of the motion picture may be presented for projection. Worm 34 on the shaft 30 is geared with worm wheel 36 to which is attached for simultaneous rotation sprocket wheel 38 and gear 40. The shaft (not shown) about which they rotate has one end mounted in bearing 41 and has its other end projecting through the gear box housing and carrying sprocket wheel 28, which it drives in rotation. Sprocket chain 42 meshes with sprocket wheel 38 and is lead by means of guide rollers 44 and 46 to the driving means K of the clutch A', with which it meshes by means of sprocket wheel 48.

Each guide roller 44, 46 is mounted on a shaft 50 by means of bushing 52 so as to be rotatable thereon, the shaft 5 being rigidly mounted in a wall 54 of the reel arm 20 (see Fig. 3).

Gear 40 meshes with idler gear 56 which in turn meshes with gear 58 of the low speed part G of the speed selection means D, which gear is of the same diameter as gear 40. Thus gears 40 and 58 rotate at the same speed.

Idler gear 56 is rigidly attached to shaft 60 to the other end of which is rigidly attached gear 62, of a diameter larger than gear 56. Gear 62 meshes with gear 64 of the high speed part F of the speed selection means D.

As thus far described, rotation of drive shaft 30 in any direction at any speed will rotate gears 40 and 58 and sprocket wheel 48, each in a given direction and at the same speed and will rotate gear 64 in the same direction as gear 58 but at a speed greater than that of gear 58, the difference in speed being determined by the gear ratio employed and being a matter of choice. I have found it quite practicable to rotate gear 64 approximately four times as rapidly as gear 58.

To the driven means E of the speed selection means D (which, as has been explained above, may be connected either to the high speed part F or the low speed part G when that system is rotating in a rewinding direction, and can only be connected to the low speed part G when the transmission system is rotating in a projection direction) is attached sprocket wheel 66 which engages with sprocket chain 68 which in turn, after passing over guide rollers 70 and 72, makes connection with sprocket wheel 74 of the clutch B', thus connecting the clutch B' in driven relation to the driven means E of the speed selection means D.

If the transmission system C is rotating in a projection direction, the driven means E will be connected to the low speed part G and will thus drive the clutch B' at that low speed. Since for projection the rewinding reel support B must be free to rotate, the clutch B' will not transmit this motion to the reel support B. The clutch A', however, will transmit its rotation, as imparted by sprocket chain 42, to the projection reel support A which reel support will thus be driven in a direction for winding film upon itself. Upon reversal of the direction of rotation of the transmission system C, the rewinding reel support B will then be driven, by clutch B', sprocket chain 68, driven means D and the low speed part G at a low speed and the clutch A', now being driven in an unwinding direction insofar as projection reel support A is concerned, will be free to rotate without transmitting that rotation to the reel support A.

However, when the transmission system C is operating in a rewinding direction and the driven means E is connected, by actuation of the manually operated means H, to the high speed part F of the speed selection means D, the rewinding reel support B will thereupon be driven at an increased speed, thus speeding the rewinding operation. The clutch A' will still be driven at the low speed, but, by reason of the positive severing of connection above described, the projection reel support A will be permitted to rotate in an unwinding direction at an exceedingly high speed.

It will be noted that the active parts of the sprocket wheel assemblies 26 and 28 are attached respectively to the gears 58 and 40 for simultaneous rotation therewith. Since both of these gears constantly rotate at low speed, the sprocket wheel assemblies 26 and 28 will also rotate at low speed, thus making necessary the removal of the film from the sprocket wheels when rewinding is to take place, but not making necessary the removal of the film from the sprocket wheels when projection in the reversed direction at normal or low speed is desired.

Clutches

The clutches A' and B' are, as has previously been explained, provided in the projector in order that the appropriate reel support A or B might be driven in a winding direction but be free to rotate in an unwinding direction. Since projection occurs only at low speed, and since only in that operation does the rewinding reel support B rotate in an unwinding direction, the rewinding reel support B is not called upon to be freely rotatable at an excessively high speed. Furthermore, since during projection the speed selection means D is automatically connected to the low speed part G, the clutch B' is driven in an unwinding direction only at low speed. Therefore, the clutch B' need only be of conventional construction.

On the other hand, during the rewinding operation the projection reel support A will, if the speed selection means D be shifted to high speed, rotate so rapidly as to prohibit the employment of a conventional clutch.

The novel construction of my clutch A' is shown in detail in Figs. 3 through 8. Fig. 3 shows the clutch A' and the reel support A mounted in the lower extremity of the reel arm 20. The reel support A is of conventional construction and comprises a shaft 76 rotatably mounted in bushing 78 in the lower extremity of reel arm 20 and having fastened to the outer end thereof a support 80 and retaining lever 82 pivotable about pin 84. The interior of the support 80 contains a detent ball 86 pressed into engagement with the retaining lever 82 by means of spring 88, all in conventional manner. In order to inhibit overrunning of the reel support A, the reel arm 20 and bushing 78 are recessed at 90 and 91 in order to permit plug 92, pressed upward by spring 94 compressed between itself and plug 96, to bear against the shaft 76 and provide a frictional drag thereon.

The inner end of the shaft 76 projects into a recess 98 in the lower extremity of the reel arm 20 which houses the clutch A'. Fastened to the inner end of the shaft 76 by means of set-screw 100 cooperating with notch 102 in the shaft is the driven means L, illustrated in detail in Figs. 4 and 5. Washer 104 between the driven means L and the bushing 78 prevents axial play of the shaft 76.

In the embodiment here shown, the driven means L comprises a hub 106 adapted to fit over and engage with the shaft 76 by means of setscrew 100 in internally threaded radial aperture 108. To the hub is attached, as by staking 109, an actuator plate 111 comprising a pair of radially extending arms 110, 110' at the extremities of which are fingers 112, 112' which define that part of the control means N on the driven means L. These fingers are shaped as circumferential strips of a circle whose center is the center of the shaft 76 and the tips of those fingers are bent out from their bases in a direction parallel to the axis of the shaft 76 so as to project inwardly into the recess 98.

Freely rotatable and axially slidable on the shaft 76 is the driving means K, shown in Fig. 3 in its direction farthest to the left. The driving means K may comprise a hub 114 centrally orificed at 116 so as to receive therein the inner end of the shaft 76. Fastened to that end of the hub 114 nearest the driven means L is the driver plate 118 having a plurality of projecting teeth 120 which cooperate with the fingers 112, 112' on the driven means L and define that part of the control means N on the driving means K. Rotatable on the hub 114, but connected to it by spring thrust washer 122, is sprocket wheel 48, which is rotated by means of sprocket chain 42 and rotation of which is transmitted via spring thrust washer 122 to the hub 114 of the driving means K.

When the driving means K is in its position as shown in Fig. 3 and is rotated in a direction such that the teeth 120 are brought into contact with the protruding ends of the fingers 112 of the driven means L (in the manner shown by arrows 124 of Fig. 5), the driven means L will be driven thereby and thus the projection reel support A will be rotated in a winding direction. Should the direction of rotation of the driving means K be reversed, the teeth 120 will pass over the fingers 112, 112' in a direction opposite from that shown by the arrows 124 of Fig. 5 and will consequently ride up on the inclined surfaces thereof, this camming action being facilitated by a slight cooperating inclination of the face of each tooth 120, as may be seen best in Fig. 6. Since the driving means K is axially slidable on the shaft 76, this camming action will result in a motion of the driving means K away from the driven means L to an extent sufficient to positively sever all connection between the two means.

In order to help fix both the right hand and left hand positions of the driving means K, its hub 114 is radially orificed at 126 and in that orifice is disposed detent ball 128 and compression spring 130 retained in the orifice 126 by retainer wire 132 secured in groove 134. The detent ball 128 cooperates with a pair of circumferential grooves 136 and 138 in the inner end of the shaft 76 (see Fig. 3).

Attached to that end of the hub 114 farthest from the driven means L is that part of the driving means K adapted to engage and cooperate with the idler means M. It is here shown as an actuator plate 111 similar to that of the driven means L and comprising radial arms 113, 113' and protruding arcuate fingers 115, 115', as best shown in Fig. 8.

The idler means M is mounted in the lower extremity of the reel arm 20 coaxial with the driving means K and disposed on that side thereof opposite from the driven means L. It is here shown as capable of rotation in one direction only corresponding to the unwinding direction of the reel support A, this being achieved by an adaptation of the conventional ball clutch, and more specifically, by providing a cup 140 fixed to the reel arm 20 within which, on shaft 142, hub 144 is rotatable. Attached to the hub 144 for rotation therewith is spider 146 comprising a plurality of inclined paths 148 on which balls 150 are designed to travel. If the hub 144 rotates in one direction, the balls 150 are directed inwardly along the inclined paths 148 and hence do not come in contact with the stationary cup 140 within which they rotate, thus permitting rotation of the spider 146. Upon attempted rotation of the hub 144 in the other direction, however, the balls will be directed outwardly along their inclined paths until they come in contact with the stationary cup 140, as shown in Fig. 3. When this occurs, further attempts at rotation of the hub 144 serve merely to jam the ball between the inclined paths 148 and the cup 140, rotation being thus positively prevented.

Also attached to the hub 144 and the spider 146 is plate 152 provided with a plurality of teeth 154 projecting inwardly toward the driving means K in a position to be engaged by the protruding fingers 115, 115' on the driving means K. The action between the teeth 154 and the fingers 115, 115' on the driving means K, which two between them comprise the control means P, is quite similar to the interaction between the elements of the control means N except that the direction of rotation effective for connection and disconnection are reversed.

From the above description the operation of this clutch A' will be apparent. When the transmission system C moves the sprocket chain 42 so as to rotate the sprocket gear 48 of the driving means K in a direction suitable for a winding operation of projection reel support A (projection direction), the driving means K will be in engagement with the driven means L (the teeth 120 will bear against the projecting tips of the fingers 112, 112', as shown by arrows 124) and the driven means L and therefore the reel support A will be driven.

Should the direction of rotation of the transmission system C be reversed (to rewinding direction), the sprocket gear 48 will be rotated in the opposite direction, the driving means K will rotate in the opposite direction, the teeth 120 will ride up along the inclined surfaces of the fingers 112, 112' on the driven means L and the driving means K will thereby be moved to the right, positively breaking connection between itself and the driven means L and thus enabling the projection reel support A to unwind at any speed. At the same time the fingers 115, 115' on the driving means K will engage with the teeth 154 on the idler means M to rotate the same.

Should the direction of rotation of the transmission system C be again reversed (back to projection direction), the sprocket wheel 48 and consequently the driving means K will once again be rotated in their original direction. But by reason of its construction the idler means M will not rotate in that direction and consequently the teeth 154 thereon will act against the inclined surfaces of the fingers 115, 115' on the driving means K, thus forcing it to the left, breaking connection between the idler means and the driving means, and remaking connection between the driving means K and the driven means L and thus automatically reconnecting the projection reel support A to the transmission system C so that the reel support A may be driven in a winding direction.

*Speed selection means*

As has been above described, it is desired to provide a two-speed transmission system in which the high speed may be used only for rewinding and in which a change in projector direction from rewinding to projection will automatically result in a shift from high to low speed.

Details of the construction which accomplishes this may be seen in Figs. 9 through 12. A shaft 156 is mounted in the gear box housing 18 with one end in bearing 168 and the other end projecting through the housing for driving the sprocket wheel 26 attached thereto. Inside the gear box housing 18 is the low speed part G of the speed selection means D which comprises the gear 58 and a hub 158 attached thereto and also attached to shaft 156 for simultaneous rotation therewith by means of set-screw 160 receivable in radial orifice 162 of the hub 158 and active upon the notched portion 164 of the shaft 156. The hub 158 is provided with one or more projecting teeth 166 with which the driven means E may be engaged, as shall hereinafter appear.

Mounted in independently rotatable fashion on the end of the shaft 156 in bearing 168 is the high speed part F of the speed selection means D, comprising the gear 64 and a hub 170 to which is attached an actuator plate 172 carrying a pair of oppositely disposed projecting lugs 174, 174'. Axial movement of the high speed part F on the shaft 156 is prevented by action of retaining ring 176 on the rim 178.

The driven means E comprises a hub 180 orificed at 182 so as to receive therein the shaft 156 in such a manner that the driven means E is independently rotatable upon said shaft 156 and is also axially slidable thereover so as to take up a left hand position (see Fig. 9) and a right hand position, positioning being facilitated by the cooperation of detent ball 128', spring 130', retainer wire 132' and radial orifice 126' in the hub 180 and the two radial grooves 136' and 138' in the shaft 156 in the same manner as has already been explained with reference to similar parts in the driving means K of the clutch A'.

To the hub 180, on the side adjacent to the low speed part G, is attached a plate 184 which carries a plurality of projecting teeth 186 adapted, when the driven means E is in its left hand position, to be engaged by the cooperating teeth 166 on the low speed part G so that the driven means E may be rotated in either direction by the low speed part G. Sprocket wheel 66 is attached to the hub 180 for rotation therewith and thereby motion of the driven means E is imparted to the sprocket chain 68 which connects the clutch B' thereto.

Attached to the hub 180 at the end thereof facing the high speed part F is a cup-shaped member 188 bearing on its end an inclined cam surface 190 extending over only a portion of the periphery of the cup-shaped member 188 and terminating in shoulder 192. In the embodiment here illustrated, two such cam surfaces 190 and shoulders 192 are shown. Washer 193 retains cup 188 on hub 180.

The incline surfaces 190, shoulders 192, and projecting lugs 174, 174' comprise the control means J.

When the driven means E is in its left hand position in engagement with the low speed part G, it rotates freely with respect to the high speed part F, a clearance being provided between the high points of the inclined surfaces 190 of the driven means E and the projecting lugs 174, 174' on the high speed part F. However, when the driven means E is in its right hand position, and when the high speed part F is rotating in rewinding direction, the projecting lugs 174, 174' will move into contact with the shoulders 192 on the driven means E, thus driving it in rotation, connection between the projections 166 of the low speed part F and the teeth 186 of the driven means E being severed by the motion of the driven means from its left hand to its right hand position.

Should the direction of rotation of the high speed part F be reversed, the lugs 174, 174' would be driven along the inclined cam surfaces 190 of the driven means E and the driven means E would thereby be axially moved from its right to its left hand position, severing connection between itself and the high speed part F and making connection between itself and the low speed part G.

The driven means E may be manually moved to connection with the high speed part F by means of sidewise pressure applied to pressure plate 194, which is loosely attached to hub 180 so as to be axially slidable with respect thereto, but resiliently forced to its left hand position by spring washer 196.

Should an attempt be made to connect the driven means E to the high speed part F while the projector is operating in a projection direction, the interaction of the lugs 174, 174' on the inclined surfaces 190 will not permit engagement. Therefore the pressure applied to the pressure plate 194 will be taken up by the spring washer 196, and the driven means E will remain connected to the low speed part G. However, should the projector be operating in a rewinding direction, pressure applied to the pressure plate 194 will move the driven means E to the right and the lugs 174, 174' of the high speed part F will engage with the shoulders 192 on the driven means E.

The manually operated means H which may apply pressure to the pressure plate 194 is illustrated in detail in Figs. 11 and 12. It comprises a shaft 198 mounted in the front cover 199 of the gear box housing 18 one end of which projects outwardly therefrom and has connected to it the control knob 200. The inner end of the shaft 198 has attached thereto a control plate 202 provided with a projecting pressure finger 204. Spring 206, one end of which is secured within the front cover 199 and the other end of which is active upon shoulder 208 of the plate 202, serves to maintain the pressure finger 204 in inoperative position, that position being here determined by the cooperation of projection 210 of the gear box housing 18 with shoulder 212 of the plate 202. Should the knob 200 be rotated until the shoulder 208 comes into contact with the projection 210, the finger 204 will be moved from its inoperative position to an operative position in which it exerts sideward pressure upon the pressure plate 194 in a direction such as to urge the driven means E into connection with the high speed part F.

The construction as above described will operate as follows: The driven means E will normally be in its left hand position connected to and driven by the low speed part G and, in the absence of positive action by the operator, will remain in that position irrespective of the direction of rotation of the low speed part G. During rewinding, rotation of the knob 200 will move the driven means E to the right out of engagement with the low speed part G and into engagement with the high speed part F to be driven thereby. Should the direction of rotation of the projector be then reversed from rewinding to projection, the control means J will automatically, without the necessity of any action on the part of the operator, force the driven means E to the left out of engagement with the high speed part F and into engagement with the low speed part G. Should the operator, while the projector is operating in a projection direction, attempt inadvertently or through ignorance to connect the driven means E to the high speed part F, the control means J will not permit such action and the friction washer 196 will prevent damage to the speed selection means D.

By providing in a single motion picture projector the two-speed, two-directional transmission system C, the fool-proof and directionally sensitive speed selection means D and the directionally sensitive clutch A' in which connection is made and broken, I have succeeded in devising a projector particularly suitable for operation by inexperienced persons which provides projection in either the normal or opposite direction at a low or projection speed and permits the time-consuming rewinding operation to be carried out at high speed or at normal speed, at the option of the operator, all of this being accomplished by means of a single and durable structure capable of operation at its designed speeds without being subject to excessive wear or breakage.

It will be apparent that many variations in detail may be made in my projector without departing from the spirit of the invention as sought to be defined in the following claims.

I claim:

1. A motion picture projector comprising a projector frame, a pair of reel supports rotatably mounted thereon, a two-speed two-directional transmission system having a high speed and a low speed, manual means operatively connected to said transmission system and effective to select the direction of rotation of said transmission system, clutch means independent of said manual means and automatically responsive to the direction of rotation of said transmission system operable to connect one of said reel supports to the low speed of said transmission system when the transmission system is rotating in a direction such that the reel support is thereby rotated for winding film on itself and operable to positively sever connection between the two when the direction of rotation of the transmission system is reversed, said reel support being thereby rendered freely rotatable, and additional independent means operable to connect the other of said reel supports to either of the two speeds of said transmission system when the transmission system is rotating in a direction such that said other reel support is thereby rotated for winding film on itself.

2. A motion picture projector comprising a projector frame, a pair of reel supports rotatably mounted thereon, a two-speed two-directional transmission system having a high speed and a low speed, manual means operatively connected to said transmission system and effective to select the direction of rotation of said transmission system, automatic means independent of said manual means and responsive to the direction of rotation of said transmission system operable to connect one of said reel supports to the low speed of said transmission system when the transmission system is rotating in a direction such that the reel support is thereby rotated for winding film on itself and operable to positively and automatically sever connection between the two when the direction of rotation of the transmission system is reversed, said reel support being thereby rendered freely rotatable, means including a clutch means automatically ordinarily connecting the other of said reel supports to the low speed of said transmission system when the transmission system is rotating in a direction such that said other reel support is thereby rotated for winding film on itself, and additional independent manual means to connect said other reel support to the high speed of said transmission system effective only when said transmission system is rotating in a direction such that said other reel support is thereby rotated for winding film on itself.

3. A motion picture projector comprising a projector frame, a pair of reel supports rotatably mounted thereon, a two-speed two-directional transmission system having a high speed and a low speed, automatic means responsive to the direction of rotation of said transmission system operable to connect one of said reel supports to the low speed of said transmission system when the transmission system is rotating in a direction such that the reel support is thereby rotated for winding film on itself and operable to positively and automatically sever connection between the two when the direction of rotation of the transmission system is reversed, said reel support being thereby rendered freely rotatable, means including a clutch means automatically ordinarily connecting the other of said reel supports to the low speed of said transmission system when the transmission system is rotating in a direction such that said other reel support is thereby rotated for winding film on itself, manual means to connect said other reel support to the high speed of said transmission system effective only when the transmission system is rotating in a direction such that said other reel support is thereby rotated for winding film on itself, and automatic control means operable automatically when the direction of rotation of the transmission system is reversed therefrom to disconnect said clutch means from said high speed and connect it to said low speed.

4. A motion picture projector comprising a projector frame, a reel support mounted thereon for two-directional rotation, a two-speed transmission system having a high speed part and a low speed part, clutch means active upon said reel support so as to drive it in one direction and to permit it to rotate in the other direction, means connecting said clutch means in driven relation to said high speed part of the transmission system effective only when the reel support would be driven thereby, and control means responsive to the direction of rotation of said transmission system for automatically disconnecting said clutch means from said high speed part when said clutch means is driven in the other direction.

5. A motion picture projector comprising a projector frame, a reel support mounted thereon for two-directional rotation, a two-speed transmission system having a high speed part and a low speed part, clutch means active upon said reel support so as to drive it in one direction and to permit it to rotate in the other direction, means connecting said clutch means in driven relation to said high speed part effective only when the clutch means would be driven thereby in the direction for driving the reel support, and control means responsive to the direction of rotation of said transmission system for automatically disconnecting said clutch means from said high speed part and connecting said clutch means in driven relation to said low speed part when said clutch means is driven in the other direction.

6. A motion picture projector comprising a projector frame, a reel support mounted thereon for two-directional rotation, a two-speed transmission system having a low speed part and a high speed part, clutch means active upon said reel support so as to drive it in one direction and to permit it to rotate in the other direction, manually actuated means connecting said clutch means in driven relation to said high speed part effective only when the reel support would be driven thereby in a direction suitable for a rewinding operation, and automatic control means responsive to the direction of rotation of said transmission system for disconnecting said clutch means from said high speed part and connecting said clutch means in driven relation to said low speed part when said clutch means is driven in the other direction.

7. A motion picture projector comprising a projector frame, a reel support mounted thereon for two-directional rotation, a two-speed transmission system having a low speed part and a high speed part, said transmission system being capable of operation in directions for projection and rewinding operations respectively, clutch means active upon said reel support so as to drive it in a direction for rewinding and to permit it to rotate in a direction for projection, means effective when said transmission system is operating in directions for projection and rewinding for connecting said clutch means in driven relation to the low speed part of said transmission system, means effective only when said transmission system is operating in a direction for rewinding for connecting said clutch means in driven relation to the high speed part of said transmission system, and control means responsive to the direction of rotation of said transmission system for automatically disconnecting said clutch means from driven relation with said high speed part when the transmission system changes direction from that for rewinding to that for projection.

8. A motion picture projector comprising a projector frame, a reel support mounted thereon for two-directional rotation, a two-speed transmission system having a low speed part and a high speed part, said transmission system being capable of operation in directions for projection and rewinding operations respectively, clutch means active upon said reel support so as to drive it in a direction for rewinding and to permit it to rotate in a direction for projection, automatic means effective when said transmission system is operating in directions for projection and rewinding for connecting said clutch means in driven relation to the low speed part of said transmission system, manual means effective only when said transmission system is operating in a direction for rewinding for connecting said clutch means in driven relation to the high speed part of said transmission system, and automatic control means for disconnecting said clutch means responsive to the direction of rotation of said transmission system from driven relation with said high speed part and connecting it in driven relation with said low speed part when the transmission system changes direction from that for rewinding to that for projection.

9. In a motion picture projector comprising a projector frame, a reel support mounted thereon for two-directional rotation, clutch means active upon said reel support so as to drive it in one direction and to permit it to rotate in the other direction; the combination of a two-speed transmission system comprising a low speed driving means and a high speed driving means coaxial therewith, a driven means connected to said clutch means slidable between said two driving means, manual means operable when said transmission system is rotating in one direction to move said driven means into engagement with said high speed driving means, and control means on said driven means and said high speed driving means operable when the direction of rotation of said driving means is reversed to move said driven means away from and out of engagement with said high speed driving means and into engagement with said low speed driving means.

10. In a motion picture projector comprising a projector frame, a reel support mounted thereon for two-directional rotation, and clutch means active upon said reel support so as to drive it in one direction and to permit it to rotate in the other direction; the combination of a two-speed transmission system comprising a low speed driving wheel and a high speed driving wheel coaxial therewith, a driven wheel connected to said clutch means coaxial with and axially slidable between said two driving wheels, manual means operable when said transmission system is rotating in one direction to move said driven wheel into engagement with said high speed driving wheel, and control means on said driven wheel and said high speed driving wheel operable when the direction of rotation of said transmission system is reversed to move said driven wheel axially away from and out of engagement with said high speed driving wheel and into engagement with said low speed driving wheel.

11. A motion picture projector comprising a projector frame, a reel support mounted thereon for two-directional rotation, a rotation transmission system for said reel support, and a clutch connecting said transmission system and said reel support, in which said clutch comprises a two-directionally rotatable and axially movable driving means, a two-directionally rotatable driven means attached to said reel support, a one-directionally rotatable idler means, said driven and said idler means being oppositely axially disposed with respect to said driving means, control means on said driven means active to engage with cooperating means on said driving means and connect the driven means in driven relation therewith when said driving means is rotated in one direction and active to move said driving means axially away from and out of engagement with said driven means and into engagement with said idler means when said driving means is rotated in the opposite direction, said idler means being rotatable only in said opposite direction, and additional control means on said idler means to axially move said driving means back toward and into engagement with said driven means and out of engagement with said idler means when said driving means is again rotated in its original direction.

12. A clutch comprising a two-directionally rotatable and axially movable driving means, a rotatable driven means, an idler means rotatable only in one direction, said driven and said idler means being oppositely disposed with respect to said driving means, means on said driving means coacting with means on said driven means to drivingly connect said two means when said driving means is rotated in one direction and to cause said driving means to move axially away from and out of engagement with said driven means and into engagement with said idler means when said driving means is rotated in the opposite direction and additional means on said driving means active in conjunction with means on said idler means to connect the two in driving relationship when said driving means is rotated in said opposite direction, this being the only direction in which said idler means is rotatable, and for moving said driving means axially away from and out of engagement with said idler means and into engagement with said driven means when said driving means is again rotated in its original direction.

13. In a motion picture projector comprising a projector frame, a reel support mounted thereon for two-directional rotation, clutch means active upon said reel support so as to drive it in one direction and to permit it to rotate in the other direction; the combination of a two-speed transmission system comprising a low speed driving means and a high speed driving means coaxial therewith, a driven means drivingly connected to said clutch means and slidable between said two driving means, manual means operable when said transmission system is rotating in one direction to move said driven means into engagement with said high speed driving means, and control means on said driven means and said high speed driving means operable when the direction of rotating of said driving means is reversed to move said driven means away from and out of engagement with said high speed driving means.

LEWIS H. MOOMAW.

REFERENCES CITED

The following references are of record in the file of this patent:

UNITED STATES PATENTS

| Number | Name | Date |
|---|---|---|
| 1,234,136 | Connor et al. | July 24, 1917 |
| 1,310,211 | Philpot | July 15, 1919 |
| 1,861,584 | Readeker et al. | June 7, 1932 |
| 2,049,944 | Carpenter | Aug. 4, 1936 |
| 2,158,873 | Kaltwasser | May 16, 1939 |
| 2,196,733 | Nagel | Apr. 9, 1940 |
| 2,217,183 | Ross | Oct. 8, 1940 |
| 2,245,017 | Sinclair | June 10, 1941 |